(12) United States Patent
Hahn

(10) Patent No.: US 12,257,823 B2
(45) Date of Patent: Mar. 25, 2025

(54) METHOD FOR PRODUCING A COMPONENT

(71) Applicant: LEONHARD KURZ Stiftung & Co. KG, Fürth (DE)

(72) Inventor: Martin Hahn, Herrieden (DE)

(73) Assignee: LEONHARD KURZ Stiftung & Co. KG, Fürth (DE)

( * ) Notice: Subject to any disclaimer, the term of this patent is extended or adjusted under 35 U.S.C. 154(b) by 530 days.

(21) Appl. No.: 17/292,948

(22) PCT Filed: Nov. 5, 2019

(86) PCT No.: PCT/EP2019/080257
§ 371 (c)(1),
(2) Date: May 11, 2021

(87) PCT Pub. No.: WO2020/099191
PCT Pub. Date: May 22, 2020

(65) Prior Publication Data
US 2022/0001662 A1   Jan. 6, 2022

(30) Foreign Application Priority Data

Nov. 12, 2018 (DE) .......................... 102018128194.3
Jul. 31, 2019 (DE) .......................... 102019120711.8

(51) Int. Cl.
B29C 45/14   (2006.01)
B29C 45/00   (2006.01)
(Continued)

(52) U.S. Cl.
CPC ...... *B41F 16/0053* (2013.01); *B29C 45/0053* (2013.01); *B29C 45/14336* (2013.01);
(Continued)

(58) Field of Classification Search
CPC ........ B29C 45/14336; B29C 45/14688; B29C 45/14827; B29C 45/16171; B29C 45/1615; B29C 2045/1673
(Continued)

(56) References Cited

U.S. PATENT DOCUMENTS 5,443,673 A * 8/1995 Fisher ................. B29C 66/0242
156/60
5,474,134 A   12/1995 Spotzl et al.
(Continued)

FOREIGN PATENT DOCUMENTS

CN   101602243        12/2009
CN   101602243 A     12/2009
(Continued)

OTHER PUBLICATIONS

Taiwanese Office Action of Jan. 5, 2023.
(Continued)

*Primary Examiner* — Edmund H Lee
(74) *Attorney, Agent, or Firm* — Hoffmann & Baron, LLP

(57) ABSTRACT

A method for producing a component, and an injection-molding device. In the method, the following steps are carried out, in particular in succession: closing an injection mold, injection molding a base body by introducing a first plastic material into a first injection-molding cavity, opening the injection mold, stamping one or more first film elements and removing the component from the mold.

17 Claims, 7 Drawing Sheets

(51) Int. Cl.
  *B29C 45/16* (2006.01)
  *B29C 45/64* (2006.01)
  *B41F 16/00* (2006.01)
  *B29K 75/00* (2006.01)
(52) U.S. Cl.
  CPC .. *B29C 45/14688* (2013.01); *B29C 45/14827* (2013.01); *B29C 45/1635* (2013.01); *B29C 45/1671* (2013.01); *B29C 45/64* (2013.01); *B41F 16/008* (2013.01); *B29C 2045/1637* (2013.01); *B29C 2045/1673* (2013.01); *B29C 2945/76464* (2013.01); *B29K 2075/02* (2013.01)
(58) Field of Classification Search
  USPC .......................................................... 264/255
  See application file for complete search history.

(56) References Cited

U.S. PATENT DOCUMENTS

| | | | |
|---|---|---|---|
| 5,746,962 A | 5/1998 | Yamamoto | |
| 6,391,242 B2 * | 5/2002 | Preisler | B60R 21/21656 29/DIG. 37 |
| 2003/0135943 A1 * | 7/2003 | Meyer | A46B 5/026 264/293 |
| 2007/0269671 A1 | 11/2007 | Hirschfelder et al. | |
| 2009/0302490 A1 | 12/2009 | Lee et al. | |
| 2010/0260971 A1 | 10/2010 | Chang | |
| 2010/0271281 A1 | 10/2010 | Tsao et al. | |
| 2012/0086141 A1 | 4/2012 | Jung et al. | |
| 2012/0292817 A1 | 11/2012 | Deckert et al. | |
| 2014/0037917 A1 | 2/2014 | Branch et al. | |
| 2015/0164209 A1 | 6/2015 | Stoerkel et al. | |
| 2015/0251408 A1 | 9/2015 | Drinic et al. | |
| 2015/0314502 A1 | 11/2015 | Stoelben et al. | |
| 2019/0084285 A1 | 3/2019 | Weissenberger | |
| 2019/0381821 A1 | 12/2019 | Schmidt et al. | |

FOREIGN PATENT DOCUMENTS

| | | | |
|---|---|---|---|
| CN | 101898401 | * | 12/2010 |
| CN | 102834274 | | 12/2012 |
| CN | 102834274 A | | 12/2012 |
| CN | 104837597 | | 8/2015 |
| CN | 104837597 A | | 8/2015 |
| CN | 10335462 | * | 12/2016 |
| CN | 108749282 A | | 11/2018 |
| DE | 10252163 A1 | | 5/2004 |
| DE | 102004041833 A1 | | 3/2006 |
| DE | 102006016200 A1 | | 10/2007 |
| DE | 102010020039 A1 | | 11/2011 |
| DE | 102011102722 A1 | | 11/2012 |
| DE | 102012109315 A1 | | 4/2014 |
| DE | 102017101595 B3 | | 5/2018 |
| EP | 1977875 A1 | | 2/2008 |
| JP | 08-11419 | | 1/1986 |
| JP | 61-135731 A | | 6/1986 |
| JP | 61-122819 U | | 8/1986 |
| JP | 62282969 | * | 12/1987 |
| JP | S63135214 A | | 6/1988 |
| JP | 63254016 | * | 10/1988 |
| JP | S6418617 A | | 1/1989 |
| JP | H06278162 | * | 10/1994 |
| JP | 08-11419 A | | 1/1996 |
| JP | 08011419 | * | 1/1996 |
| JP | 8-18345 | | 2/1996 |
| JP | 8-18345 B2 | | 2/1996 |
| JP | 08-276462 A | | 10/1996 |
| JP | 2006-056106 A | | 3/2006 |
| JP | 4022819 | * | 12/2007 |
| JP | 4379874 B2 | | 12/2009 |
| KR | 20090128059 | * | 12/2009 |
| KR | 2011-0071475 | | 6/2011 |
| KR | 2011-0071475 A | | 6/2011 |
| KR | 2011-0071745 | | 6/2011 |
| KR | 2011-0071745 A | | 6/2011 |
| TW | 201309465 | | 3/2013 |
| TW | 201309465 A | | 3/2013 |
| WO | 97/47454 A1 | | 12/1997 |
| WO | WO9747454 | * | 12/1997 |
| WO | 01/76847 A1 | | 10/2001 |
| WO | WO 01/76847 | | 10/2001 |
| WO | WO2007053034 | * | 5/2007 |
| WO | 2012/020621 A1 | | 2/2012 |
| WO | WO 2012/020621 | | 2/2012 |
| WO | 2012/139977 A2 | | 10/2012 |
| WO | WO 2012/139977 | | 10/2012 |
| WO | 2014/022361 A1 | | 2/2014 |
| WO | WO 2014/022361 | | 2/2014 |
| WO | WO2017016753 | * | 2/2017 |
| WO | 2017097444 A1 | | 6/2017 |
| WO | 2017215840 A1 | | 12/2017 |
| WO | WO 2017215840 | | 12/2017 |

OTHER PUBLICATIONS

Herbst R. et al: "Die dreifache Kombination Mehrkomponenten-Spritzgiessen von Thermoplasten Elastomeren und Duroplasten", Kunststoffe, Carl Hanser Verlag, München, Germany, vol. 90, No. 10, Oct. 1, 2000, p. 2, Right Column—p. 3, Left Column Drawings 1, 2.
Japanese Office Action dated Sep. 12, 2023.
Taiwanese Office Action dated Feb. 26, 2024.
Japanese Office Action dated Feb. 27, 2024.
South Korean Office Action dated Oct. 21, 2024.

* cited by examiner

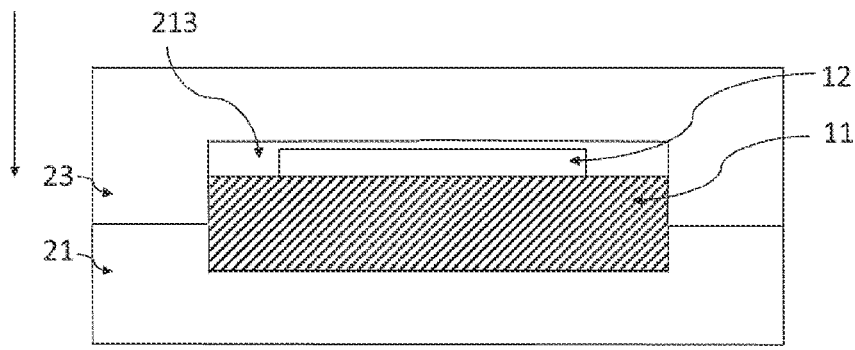
Fig. 2a
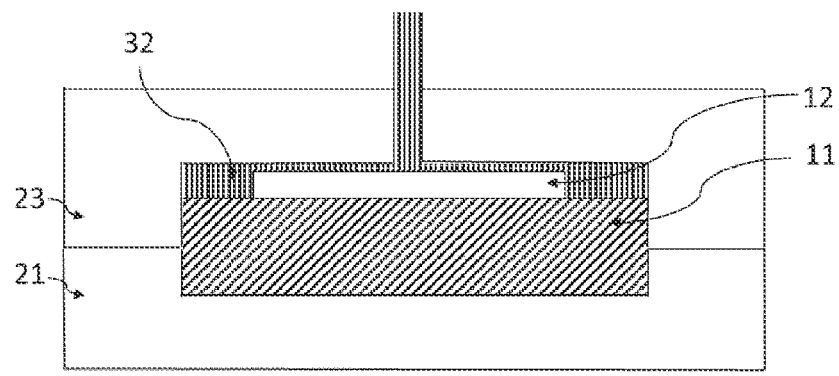
Fig. 2b
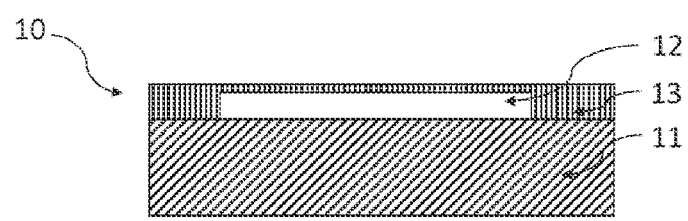
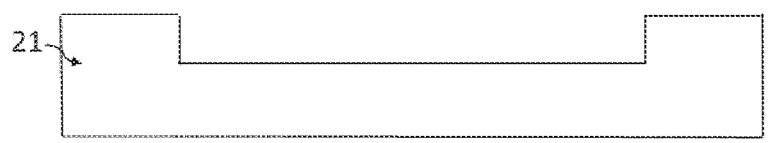
Fig. 2c

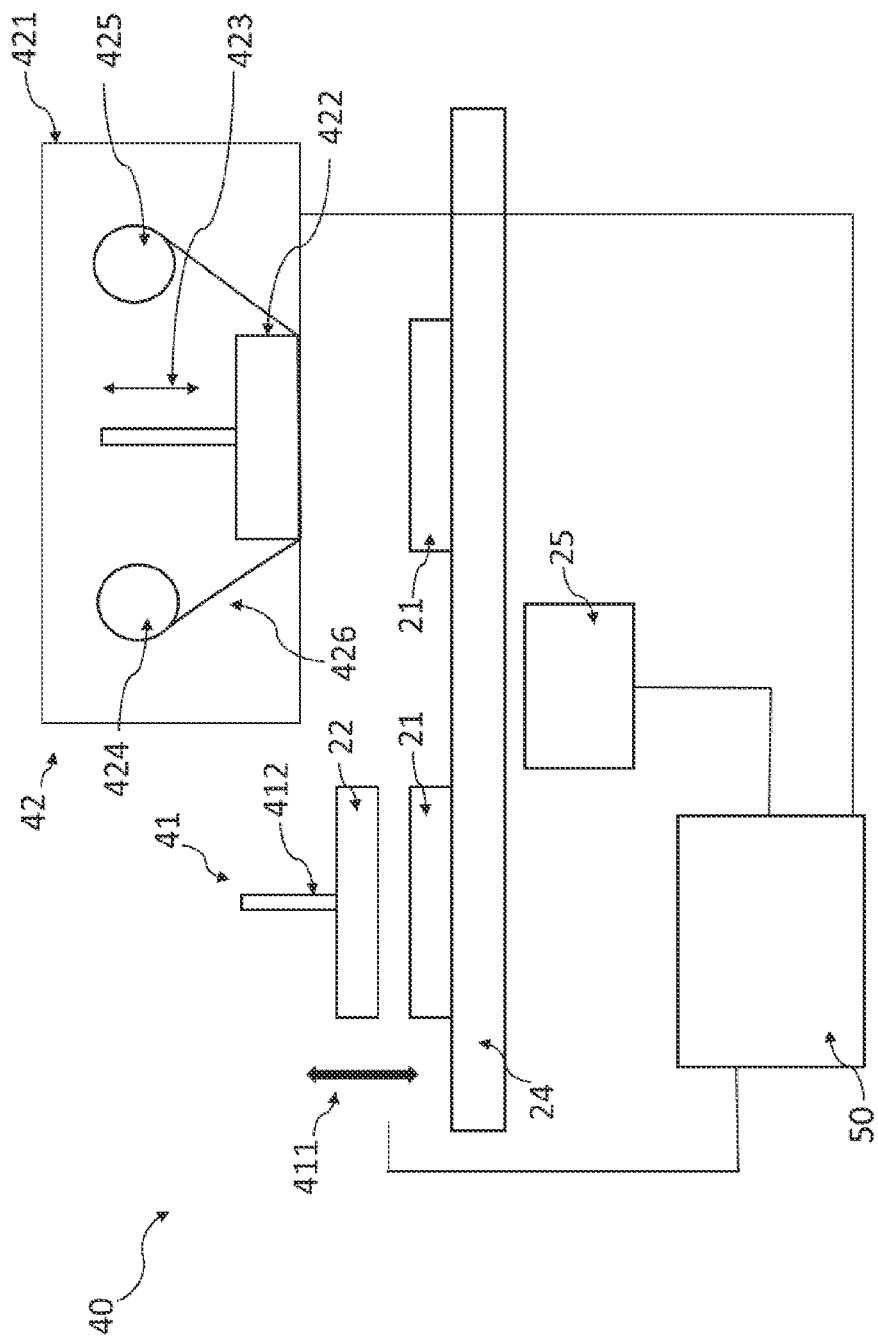

METHOD FOR PRODUCING A COMPONENT

This application claims priority based on an International Application filed under the Patent Cooperation Treaty, PCT/EP2019/080257, filed Nov. 5, 2019, which claims priority to DE 102018128194.3, filed Nov. 12, 2018, and DE 102019120711.8, filed Jul. 31, 2019.

BACKGROUND OF THE INVENTION

The invention relates to a method for producing a component, and an injection-molding device for this.

It is known to produce plastic components by means of injection molding. To decorate such components, a method also known as "in-mold decoration" is described, for example, in DE 102010020039 A1. For this, a hot-stamping film is used to produce a covering part made of plastic. This hot-stamping film is guided through an injection mold from the top to the bottom and the film is clamped between the mold halves when the mold is closed. When the molten material is injected, the film is pressed against the wall of the cavity by the pressure of the molten material. After cooling, the polyester carrier film of the hot-stamping film is then peeled off the component decorated with the transfer ply of the hot-stamping film.

However, the limited possibilities for decoration are disadvantageous here, because of the extensive application area defined by the respective injection mold half, and because of the high pressure and the high temperatures to which the decorative layers of the hot-stamping film are exposed inside the injection mold during the application.

Further, it is also known to stamp a transfer ply of a hot-stamping film onto a body for decoration. As described for example in DE 102012109315 A1, such a stamping device has a retaining device, in which the workpiece to be stamped is clamped, as stamping receiver. Further, a stamping tool is provided, which presses a hot-stamping film against the surfaces of the workpiece to be decorated, wherein the stamping pressure here is built up between stamping receiver and stamping tool.

SUMMARY OF THE INVENTION

The object of the invention now is to specify a method for producing a component, as well as a component which has improved functions and/or decorative properties and can still be produced cost-effectively.

The invention is achieved by a method for producing a component in which the following steps are carried out:
  a) closing an injection mold comprising a first mold half with a first mold cavity and at least one second mold half, wherein a first injection-molding cavity defined by the first mold half and the at least one second mold half is formed,
  b) injection molding a base body by introducing a first plastic material into the first injection-molding cavity,
  c) opening the injection mold, wherein the base body remains following the contours in the first mold cavity of the first mold half and only a first partial area of the surface of the base body is exposed, but a second partial area of the surface of the base body still remains in the first mold half,
  d) stamping one or more first film elements onto at least one partial area of the exposed first partial area of the surface of the base body, wherein the base body remains following the contours in the first mold cavity of the first mold half and the first mold half acts as stamping receiver for the stamping of the one or more first film elements,
  e) removing the component, comprising the base body and the one or more first film elements, from the first mold half.

This object is further achieved by an injection-molding device for producing a component, in particular according to the above-described method, in which the injection-molding device has at least one first injection-molding station and at least one stamping station. The injection-molding device further has at least one first mold half with a first mold cavity and at least one second mold half. The at least one first injection-molding station has a closing device, which is formed to close an injection mold comprising the first mold half or one of the first mold halves and the at least one second mold half, forming a first injection-molding cavity, and to open the injection mold. The at least one first injection-molding station has an injection unit for introducing a first plastic material forming a base body into the first injection-molding cavity. The stamping station has a stamping unit for stamping one or more first film elements onto at least one partial area of the surface of the base body, which is arranged following the contours in the first mold cavity of the first mold half, wherein the first mold half of the stamping unit acts as stamping receiver for the stamping of the one or more first film elements.

Studies have shown that it is possible to decorate a plastic component produced in an injection-molding process by means of a downstream hot-stamping machine. For this, the components are taken out of and/or ejected from the injection mold after the cooling phase and then placed in the stamping receiver of the stamping machine. The stamping receiver then also provides the necessary precisely fitting lining structure here in addition to the function of holding the component, in order that corresponding pressure can also be built up on the required stamping surfaces. However, the inventors have discovered that the following difficulties or economic disadvantages arise in the case of such a procedure:

The stamping receiver, i.e. the component receiver, always has to be manufactured very precisely. Thus, it has been shown that a precise manufacture of the stamping receiver is very relevant to the quality during the stamping with respect to the stamping quality. Precisely in the case of multiple cavities in injection molds, however, higher component tolerances result, which can only be accepted with difficulty by a corresponding formation of the stamping receiver in the hot-stamping process. Here, studies have further shown that the problem generated hereby of the decrease in the stamping quality increases as the component size increases. This is probably also due to the distortion of the plastic components in the cooling process and the component tolerance that increases as the component size increases. The falling stamping quality thus also becomes noticeable in a particularly negative manner precisely in the case of large components or in the case of multiple cavities in the injection-molding technology, as the component tolerances and also the shrinkage factors or the component distortion are greater here. This has further shown that the reject rate increases due to this problem and also that the process stability of the stamping process can hit its limits. Further, the costs for the stamping receiver also rise as the size of the components increases.

Through the invention, it is now possible to improve the stamping quality and to lower the process costs:

In order to obtain a precisely fitting stamping receiver, which also molds all component tolerances with it, the stamping process is integrated into the injection-molding machine and correspondingly uses the mold half which in particular molds the so-called component underside as stamping receiver. The component is thus prevented from relocating before the stamping is carried out, and instead it also continues to be held in the injection-molding cavity during the stamping. The intrinsically stable construction of injection-molding machines and injection molds, which are necessary for the very high pressures and temperatures occurring there, makes it possible here to absorb the correspondingly required stamping pressure (depending on the decorative surface area, component size and the plastic material) during the stamping. It is furthermore possible to utilize the residual heat of the injection-molding process in the component as additional stamping energy and hereby also to achieve energy savings and/or shortened stamping times and/or improved adhesions between the component surface and the one or more film elements.

Because the component is stamped before being removed from the mold and the component remains following the contours in the first mold cavity during the stamping and the first mold half, which was used previously to mold the component, acts as stamping receiver for the stamping, the above-named disadvantages are avoided. It is hereby ensured that the stamping receiver is adapted in a precisely defined manner to the component and mold all component tolerances with it in a precisely fitting manner. The stamping can hereby further also be carried out before the component is completely cooled and before the component is removed from the mold, whereby the component tolerances occurring due to the thermal distortion and possibly mechanical distortion during removal from the mold also do not negatively influence the stamping process, and thus the stamping quality. For this, it has further also been shown that the adjustment work for optimizing the stamping process can be reduced considerably, and the stamping quality and the process stability increase considerably.

Further, studies have shown that this also results in positive effects with respect to the adhesion between stamped film elements and base body produced by means of injection molding. This is probably because the stamping is effected here immediately after conclusion of the injection-molding process and thus the stamping is carried out at a time when the base body still has a particularly reactive surface, which is moreover still at a very high temperature level because of the preceding injection-molding process.

Further advantages result when the stamping is carried out by means of a hot-stamping process, as the process heat of the injection-molding process can be used for the stamping process here, and corresponding energy savings and/or shortened stamping times can thus moreover be achieved in the overall process.

Further advantages of the invention result from the fact that the stamping can be carried out during the cooling phase of the injection-molding process, with the result that, despite the additional decoration, the cycle time of the production process is not lengthened. This "parallelization" results in a corresponding reduction in the production time, which is moreover also associated with corresponding cost savings.

Advantageous embodiment examples of the invention are described in the dependent claims.

According to a preferred embodiment example, the application of a cover layer made of a second plastic material, which is preferably carried out by means of injection molding and/or flooding and/or partial overspraying, can be effected in a further step after the one or more first film elements have been stamped. It is hereby possible, for example, to provide the one or more first film elements and/or the surface of the base body with an additional protective layer or to create further functional structures in the component and/or on the component. It is particularly advantageous here that it is hereby possible to integrate the one or more first film elements, completely or in areas, in layers of the component produced by means of injection molding.

When this step is carried out, the base body preferably remains following the contours in the first mold cavity of the first mold half. The first mold half is thus additionally not only utilized to form the stamping receiver for the stamping of the one or more first film elements, but also forms the component receiver for the application of the cover layer.

When this step is carried out, a second injection-molding cavity is preferably formed by means of one or more third mold halves, and the second plastic material is introduced into the second injection-molding cavity. A sealing of the one or more third mold halves against the base body, the one or more first film elements and/or the first mold half is preferably effected here, whereby a correspondingly large variation range is made possible with respect to the areas which are provided with the cover layer.

It is advantageous here to apply the cover layer such that the one or more film elements are encased between the base body and the cover layer. This encasing makes it possible to protect the film elements correspondingly well from environmental influences or to achieve particularly advantageous optical and/or functional effects through the interactions brought about hereby.

Further, it is also possible for the cover layer to be applied such that the cover layer completely overlaps the one or more first film elements and/or the first partial area of the surface of the base body. For example, a correspondingly closed protective layer or decorative layer can hereby be created in the corresponding partial area of the surface of the component which is, for example, to form the outside of the component exposed to atmospheric conditions.

Further, it is also possible for the cover layer to be applied such that the cover layer overlaps the one or more first film elements and/or the first partial area of the surface of the base body only over part of the surface. This overlapping over part of the surface can moreover also be effected registered relative to the one or more first film elements and/or the first partial area of the surface of the base body, in order thus to create, correspondingly registered, through the cover layer, functional and/or decorative elements which correspondingly interact with and/or supplement decorative elements and/or functions of the first film elements.

By register or registration, or register accuracy or registration accuracy, is meant a positional accuracy of two or more elements and/or layers relative to each other. The register accuracy is to range within a predetermined tolerance, which is to be as low as possible. At the same time, the register accuracy of several elements, partial areas, in particular one or more first partial areas, films and/or layers relative to each other is an important feature in order to increase the process reliability. The positionally accurate positioning is effected in particular by means of markings, in particular by means of sensorially, preferably optically detectable registration marks or register marks. These markings, in particular registration marks or register marks, preferably either represent specific separate elements or areas or layers or are preferably themselves part of the elements or areas or layers to be positioned.

The second plastic material can consist of a thermoplastic material and/or of a plastic material that cures by crosslinking, in particular a two-component (2K) material, and/or of a thermally curable and/or radiation-curable material and/or of a mixture of such plastic materials.

The second plastic material particularly advantageously consists of a two- component plastic, which is mixed in a mixing head when the two components are injected, in particular into the second injection-molding cavity, with the result that a mixture enters the second injection-molding cavity. The reaction of the mixture takes place in the second injection-molding cavity and can also still proceed further after the mold has been opened. The use of such materials makes it possible to achieve a particularly hard and weatherproof cover layer.

Further, it is also possible for the second plastic material to be post-cured or fully cured in a later or several later step(s). Such a post-curing or full curing can be effected for example by means of irradiation, in particular UV irradiation and/or electron beam curing.

Plastic materials consisting of polyurethane or polyurea are preferably used as second plastic material. The thickness of the cover layer is preferably chosen in a range of between 100 μm and 20,000 μm, in particular 100 μm to 10,000 μm, preferably between 200 μm and 5000 μm.

The first plastic material preferably consists of a thermoplastic, in particular of an impact-resistant thermoplastic. The first plastic material consists in particular of polyethylene (PE), polycarbonate (PC), polypropylene (PP), polystyrene, polybutadiene, polynitriles, polyesters, polyurethanes, polymethacrylates, polyacrylates, polyamides, polyethylene terephthalate (PET), polybutylene terephthalate (PBT), preferably acrylonitrile butadiene styrene (ABS), acrylonitrile styrene acrylate (ASA), ABS-PC, PET-PC, PBT-PC, PC-PBT and/or ASA-PC and/or copolymers or mixtures thereof. In principle, the first and/or second plastic material can further also contain inorganic or organic fillers, preferably $SiO_2$, $Al_2O_3$, $TiO_2$, clay minerals, silicates, zeolites, glass fibers, carbon fibers, glass beads, organic fibers or mixtures thereof. Here, the fillers are added in particular to the first plastic material in order to further increase the stability of the base body. Further, these fillers can reduce the proportion of polymeric materials and thus lower the production costs and/or the weight of the component.

It is particularly advantageous to repeat the step of applying a cover layer made of the second plastic material, in particular by overspraying, flooding and injection molding, multiple times. Here, different second plastic materials and/or different third mold halves can further also be used in the successive steps, with the result that corresponding cover layers differing with respect to their molding and/or their material are applied to one another. Further, it is also possible here to carry out step d), i.e. stamping the one or more film elements, in each case additionally another one or more times after the respective application of the cover layer. It is thus possible for example, after a first cover layer has been applied, to carry out step d) again, then to apply a further cover layer, optionally in a different molding and/or made of a different material, to it again, to stamp one or more first film elements on it again, etc. This makes it possible to realize correspondingly complex decorative and/or functional functions in the component cost-effectively.

In all of these steps, the base body preferably remains following the contours in the first mold cavity of the first mold half. For one thing, a correspondingly high stamping quality is hereby also ensured for the further stamping steps and, for another, a particularly good registration of the further first film elements applied, and of the further cover layers, is also achieved. As a result, the registration of the film elements and/or cover layers applied and thus the product quality are further considerably improved and waste is correspondingly reduced.

The chronological sequence of steps b) and d), i.e. injection molding the base body and stamping the one or more first film elements, is preferably controlled such that the base body is only partially cooled when step d) is carried out. The advantages already set out above can be accomplished hereby. For one thing, a particularly good interlayer adhesion between the surface of the base body and the one or more first film elements is thus achieved hereby. For another, it is hereby possible to utilize the process energy of the injection-molding process additionally for the stamping process and as a result to achieve energy savings and/or a shortening of the stamping time.

A corresponding control of the chronological sequences is preferably also effected for the case that, after the step of "applying a cover layer" has been carried out, a stamping of one or more film elements is effected again, in order to accomplish the above-named advantages likewise in the case of in such a method sequence.

Studies have further revealed here that the above-named advantages are to be achieved particularly well if the base body or the cover layer has an average surface temperature in particular in the first partial area of the surface of the base body of between 20° and 120°, in particular between 40° and 100°, preferably between 50° and 80°.

The stamping of the one or more first film elements in step d) can preferably be carried out by means of roll-on stamping, partial roll-on stamping or vertical stamping. Further, it is also possible to use corresponding stamping methods for this, such as are described in DE 102012109315 A.

The stamping of the one or more first film elements is preferably carried out with one or more stamping tool(s), which apply a film or one or more sections of a film as first film elements to the exposed first partial area or a partial area of the exposed first partial area of the surface of the base body. The stamping tools here are preferably stamping dies or stamping rollers, which can optionally also be adapted correspondingly to the shape of the base body or make a corresponding following of the contours with respect to the surface contour of the first partial area of the surface of the base body possible in their guiding and in their roll-on behavior, or are adapted thereto. Such stamping dies and stamping rollers preferably have in each case an elastomeric base body or elastomeric layers, for example made of silicone.

In particular transfer films, for example hot-stamping films or cold-stamping films, but also laminating films, come into consideration as films when step d) is carried out.

Transfer films which comprise a carrier ply and a transfer ply detachable therefrom are particularly suitable for use here. The carrier ply here preferably consists of a plastic film, for example a PET film with a thickness of between 10 μm and 250 μm. The transfer ply here has one or more layers which are preferably selected from: one or more decorative layers, one or more functional layers, one or more protective layers, one or more adhesion-promoting layers, one or more barrier layers, one or more conductive layers.

Further, it is advantageous if one or more detachment layers, which improve the detachability, are arranged between the carrier ply and the transfer ply. Such layers preferably contain waxes and/or silicones and/or polymers.

If such a transfer film is designed as a stamping film, it preferably has a thermally activatable adhesive layer, which can in particular be activated by the thermal energy of the stamping tool, on the side of the transfer film facing away from the carrier ply.

Further, it is also possible for the transfer ply of the transfer film further to have, for example, openings introduced by means of punching or cutting or laser exposure or for the transfer ply to be provided in the form of patches on the carrier ply. Such transfer plies further preferably also have another one or more carrier films for stabilizing the transfer ply. This further results in the advantage that "sensitive" functional and decorative layers receive an additional protection from the thermal and mechanical stresses of the stamping process or the subsequent process steps.

Laminating films preferably do not have a "detachable" carrier ply. Laminating films preferably have one or more of the following layers: one or more decorative layers, one or more functional layers, one or more protective layers, one or more carrier layers, one or more adhesion-promoter layers, one or more carrier films, one or more barrier layers, one or more conductive layers.

The laminating films here preferably have in particular openings introduced by punching and/or cutting and/or laser exposure or are already supplied to the stamping process in the form of "pills" during the stamping.

The one or more first film elements applied by means of the one or more stamping tools here preferably have a shape which can be predetermined to a large extent by the design of the one or more stamping tools, the shape of the film or the transfer ply of the film and/or by further measures, as described further below. These film elements are defined with respect to their layer structure by the corresponding layer structure of the film used for the stamping or the transfer ply of the film used for the stamping. The one or more first film elements thus preferably have in any case one or more layers selected from: one or more decorative layers, one or more functional layers, one or more protective layers, one or more adhesion-promoting layers, one or more adhesive layers, one or more carrier layers, one or more carrier films.

One decorative layer or the decorative layers here preferably consist of one or a combination of the following decorative layers:
 transparent or translucent or opaque varnish layer containing dyes and/or pigments, in particular organic/inorganic pigments, luminescent and/or fluorescent pigments and/or dyes, optically variable pigments, thermochromic pigments and/or dyes, metallic pigments, magnetically alignable pigments,
 volume hologram layer,
 layer with optically active surface relief, in particular a diffractive and/or refractively acting surface relief, a holographic surface relief, a surface relief containing refractive structures, diffractive structures, in particular lens structures, microlens arrangements, microprisms, micromirrors, matte structures, in particular isotropic and/or anisotropic matte structures and/or a combination of any such structures;
 reflective layers, in particular metallic or dielectric reflective layers;
 high-refractive-index or low-refractive-index layers, in particular with refractive indices which differ from a refractive index of 1.5 by more than +/−0.2;
 liquid crystal layers, in particular cholesteric and/or nematic liquid crystal layers;
 thin-film layers, which display an optically variable color-change effect, in particular comprising an absorber layer, a dielectric spacer layer and an optional reflective layer or alternatively comprising a multiple sequence of alternating high-refractive-index and low-refractive-index transparent layers.

These decorative layers can here be applied to each other and/or next to each other in any sequence. Each individual decorative layer can here be formed patterned over part of the surface, in order to achieve in particular a desired graphic decoration. The decorative layers are preferably arranged registered relative to each other.

The functional layer or the functional layers preferably consist of one or a combination of the following functional layers listed: layers with an electrical functionality, in particular comprising one or more elements selected from: touch sensor, antenna, electromagnetic shielding, electrically non-conductive, metallic layers for preventing electrostatic discharge, display, LED, electric circuit, solar cell, layer with a magnetic functionality, for example a magnetic barcode, layers with mechanical functionality, for example reinforcing elements or stiffening elements made of metal and/or plastic and/or woven and/or non-woven fiber plies and/or fibrous additives and/or fibrous additional layers, layers with optical functionality, for example anti-reflection layers or reflective layers, layers with tactile functionality, for example soft-touch surface coatings.

During the stamping of the one or more first film elements, in particular if a hot-stamping film is used, a section of a transfer ply defined by the shape of the stamping tool is preferably applied as first film element by activating an adhesive layer of the transfer ply or an adhesive layer provided between the base body and the transfer ply.

Further, it is advantageous, in particular if a cold-stamping film is used, to apply an adhesive layer to the carrier ply and/or to a partial area of the surface of the base body in a first area, but not in a second area, to guide the transfer film by means of the stamping tool towards the surface of the base body, to activate the adhesive layer and to peel the transfer film off again, with the result that a sections of the transfer ply defined by the shape of the first area is applied to the base body as first film element. The application of the adhesive layer here is preferably effected by means of a digital printing method, in particular by means of an inkjet printhead.

The adhesive layer is preferably cured by means of high-energy electromagnetic radiation. The curing can be effected in particular before and/or during and/or after the application of the transfer ply to the adhesive layer. If the curing is effected before the application of the transfer ply to the adhesive layer, the adhesive layer can thereby be pre-cured in order, for example, to increase the viscosity of the adhesive layer in a targeted manner. If the curing is effected during the application of the transfer ply to the adhesive layer, the curing can be effected with the carrier ply still joined to the transfer ply. If the curing is effected after the application of the transfer ply to the adhesive layer, the curing can be effected with the carrier ply already peeled off the transfer ply and exposed transfer ply from the upper side of the base body.

During the curing of the adhesive layer, still further layers and/or partial areas of the component and/or of the first and/or second film elements can also be cured with it at the same time or post-cured by the radiation acting on the component and the first and/or second film elements.

Further, it is advantageous for one or more second film elements to be introduced into the first injection-molding cavity before step a) is carried out, i.e. the injection mold is closed. For this, the one or more second film elements are in particular placed in the first mold half as individual elements and/or supplied in the form of a film web.

The one or more second film elements can preferably be either a laminating film preferably formed over part of the surface, for example as a "label", or a so-called "insert" as a pre-molded partial element provided in particular with decorative and/or functional elements, or an insert part in particular as a functional reinforcing or stiffening element made of metal and/or plastic and/or fiber composite and/or plastic with fiber components, or a transfer film.

The one or more second film elements are then back-injection molded and/or extrusion coated with the first plastic material in step b).

It is hereby possible to achieve a decoration of the component "on both sides" or a provision of the component with the desired functional layers on both sides. Thus, for example, the underside of the base body is formed by the one or more second film elements, and on the upper side of the base body the one or more first film elements form the upper side of the component.

The component and/or the base body can be formed opaque or translucent or transparent in order to provide different optical appearances of the component.

If the component and/or the base body is formed transparent for example, the decoration on both sides can, together, generate a depth effect through the spacing of the two decorations due to the wall thickness of the component and/or the base body. For this, the thickness of the base body is preferably chosen such that the one or more first film elements on the one hand and the one or more second film elements on the other hand are spaced apart from each other such that an optical depth effect is generated by the interaction of the one or more first and one or more second film elements.

If the component and/or the base body is formed opaque for example, the decoration on both sides can provide a different optical appearance of the component from different sides through the one or more first and second film elements.

Through the use of one or more first film elements and one or more second film elements, a combination of decorative films and functional films can also be effected. For example, a decoration can be effected on one side of the component and an application of a functional element, for example a touch sensor or an antenna or a display, can be effected on the other side of the component.

The production process can be designed such that the film elements which are more resistant to pressure and/or heat are used as second film elements and the film elements which are less resistant to pressure and/or heat are used as first film elements. In this variant, a functional element can thus be applied to the component as one or more first film elements and a decorative element can be applied to the component as one or more second film elements.

The production process can alternatively also be designed such that one or more functional elements are applied to the component as one or more second film elements and one or more decorative elements are applied to the component as one or more first film elements.

It is particularly advantageous here that the one or more first and second film elements can be arranged particularly register-accurate relative to each other through the method. This is because, both in the back-injection molding of the one or more second film elements and in the stamping of the one or more first film elements, the base body is defined by the first mold cavity of the first mold half, and thus no further registration step has to be effected any more in this respect.

Further, when step d) is carried out, i.e. when the one or more film elements are stamped, one or more of the first film elements are preferably stamped register-accurate relative to one or more of the second film elements. For this, it is advantageous to detect one or more register marks and/or optical features of the one or more second film elements and/or of the first mold half and to use these to control the stamping. In addition, corresponding register marks and/or optical features of the film can be detected, which are used in the stamping of the one or more first film elements, as set out above.

Further, it is advantageous if the method further comprises the following step, which is preferably carried out after step c) and/or d) and further preferably before one of steps e) and/or f):

printing on the one or more first film elements and/or the exposed first partial area of the surface of the base body in at least one further partial area, wherein the base body remains following the contours in the first mold cavity of the first mold half and in particular the first mold half acts as printing holder for the printing on the one or more film elements and/or the exposed first partial area of the surface of the base body in the at least one further partial area.

Thus, it is also possible for the above step of printing to be carried out between steps c) and d) and/or d) and f).

It is possible here for the at least one further partial area to lie inside the at least one partial area in which the in or more first film elements are stamped. In this case, the printing is effected in particular on the free surface of the stamped one or more film elements.

However, it is also possible for the at least one further partial area to lie only in the exposed first partial area of the surface of the base body. In this case, the printing is effected in particular next to or adjacent to the stamped one or more film elements.

Furthermore, it is further possible for the at least one further partial area to lie both inside the at least one partial area in which the in or more first film elements are stamped and in the exposed first partial area of the surface of the base body. In this case, the printing overlaps both the one or more first film elements and the exposed first partial area of the surface of the base body at least in areas.

The printing is more advantageously effected with a printing material. The printing material is preferably an ink or a varnish.

It is further advantageous if the printing is effected register-accurate relative to the one or more first and/or second film elements, for which in particular one or more register marks or optical features of the one or more first and/or second film elements and/or of the first mold half are detected and used to control the printing.

Further, it is expedient if the printing in the at least one further partial area is produced colored, in particular in any and/or different colors.

By being colored is meant here any color which can be represented in a color model such as e.g. the RGB color model (R=red; G=green; B=blue) or the CMYK color model (C=cyan; M=magenta; Y=yellow; K=black) as a color dot within a color space.

The printing in the at least one further partial area preferably represents at least one decoration or a visually recognizable design element, which can be for example a graphically designed outline, a figurative representation, an image, a motif, a symbol, a logo, a portrait, a pattern, a grid, an alphanumeric character, a text and the like.

The printing is advantageously carried out here by means of digital printing, preferably by means of inkjet printing, and/or pad printing. The digital printing, preferably the inkjet printing, and/or pad printing is advantageously carried out in a printing station or printing unit.

In addition to carrying out the above-described steps, it is further advantageous to carry out one or more of the following steps, also multiple times, during the production of the component:

A pretreatment of an exposed partial area of the surface of the base body and/or of the one or more first film elements is preferably effected. This pretreatment is thus preferably carried out between steps c) and d) and/or between step d) and the application of the cover layer and/or before the printing. If still further stampings are carried out and/or a cover layer is applied multiple times, as stated above, such a pretreatment is preferably also carried out before these respective steps are carried out.

As pretreatment, one or more of the following processing methods are preferably carried out: surface activation, in particular by treatment with gas, flame treatment, plasma treatment, fluorination, irradiation, cleaning, coating.

It is particularly advantageous here that, because of the "closeness" in time of the pretreatment both to the upstream injection-molding process and to the downstream stamping process, the pretreated surface is particularly "accessible" for the processing methods carried out and—due to the closeness in time—a degeneration is largely avoided. The effectiveness of the pretreatment is thus considerably increased, and for example the adhesion properties between the base body and the one or more first film elements and/or the cover layer are improved.

An optical check of the surface of the base body and/or of the one or more first film elements and/or of the printing and/or of the component is preferably carried out. This is effected in particular by means of an optical sensor, for example a camera: such an optical check is preferably carried out here using image-processing methods and can for example be used to optimize process parameters for example by incorporation into a corresponding control loop, in order thus to further reduce the reject rates. Further, this optical check can also be used for quality assurance. This optical check can take place multiple times at different times in the process, for example after the injection-molding process and/or after the pretreatment and/or after the application of the one or more film elements and/or after the printing and/or after the further coating, flooding, overspraying and/or after a cleaning process and/or after the removal of the component from the first mold cavity.

Preferably, a cleaning process is carried out in particular after step d) has been carried out, i.e. the application of the one or more first film elements, and/or after the step in which the cover layer is applied has been carried out, and/or after the printing. Through this process, for example, the exposed surface is cleaned of waste products of the stamping process. The cleaning process is preferably carried out here as long as the base body is still located in the first mold half. The base body is hereby securely fixed while the cleaning is being carried out, with the result that cleaning methods which require a stable fixing of the product to be cleaned can also be used.

The cleaning is preferably effected here by means of brushes and/or compressed air and/or suction.

Between steps b) and d) being carried out, i.e. the injection of the base body and the stamping of the one or more first film elements, and/or before the step of printing, the first mold half is preferably rotated and/or shifted in order to make it possible to correspondingly process the exposed surface of the base body, for example using a stamping unit and/or a printing unit.

Further, however, it is also possible to leave the first mold half stationary and for example to move a stamping unit arranged on a robot arm so that a stamping of the one or more film elements onto the exposed surface of the base body is made possible by means of it.

While the further processing steps described above are being carried out, in each case a shifting and/or a rotation of the first mold half is preferably also effected such that the base body can be processed correspondingly using a station allocated to the respective processing step. Thus, it is advantageous that an injection-molding device is provided with several stations, between which the first mold half is shifted, for example by shifting and/or rotation, in order to process the base body according to the above-described processing steps corresponding to the predefined method sequence.

In addition to at least one first injection-molding station and at least one stamping station, the injection-molding device further preferably has one or more of the following stations:

At least one station, in particular at least one second injection-molding station, for applying the cover layer made of a second plastic material, in particular by means of injection molding, flooding and/or partial overspraying. The at least one second injection-molding station here preferably has in each case a closing device for forming the second injection-molding cavity by means of the one or more third mold halves, in particular by sealing the one or more third mold halves against the base body, the one or more first film elements and/or the first mold half. Further, for this, the at least one second injection-molding station preferably has an injection unit for introducing the second plastic material into the second injection-molding cavity. In this respect, reference is made to the above statements.

At least one printing station, in particular for printing on the one or more first film elements and/or the exposed first partial area of the surface of the base body in at least one further partial area, wherein the base body remains following the contours in the first mold cavity of the first mold half and in particular the first mold half acts as printing holder for the printing on the one or more film elements and/or the exposed first partial area of the surface of the base body in the at least one further partial area. Advantageously, the at least one printing station is a digital printing station, preferably inkjet printing station, and/or pad printing station.

At least one pretreating station for pretreating in particular a partial area of the exposed surface of the base body: this pretreating station here preferably carries out the one or more processing methods already described above, which are in particular selected from: treatment with gas, flame treatment, plasma treatment, fluorination, irradiation, cleaning, surface activation, coating.

One or more checking stations, in particular for optically checking the surface of the base body, the one or more first film elements and/or the component: the check can here be effected, as already stated above, in particular by means of optical sensors, in particular a camera.

A cleaning station, in particular for cleaning the surface of the component by means of brushes and/or compressed air and/or suction. In this respect as well, reference is made to the above statements regarding the cleaning step.

A demolding station for removing the component comprising the base body, the one or more first film elements, and optionally the one or more second film elements and/or the cover layer from the first mold half. In the demolding station, a corresponding cooling and curing of the component can further also be carried out before removal from the mold.

The movement of the first mold half here is preferably realized by the first mold half being arranged on a movably mounted mold carrier and in particular being securely connected to it. This mold carrier is preferably a vertically or horizontally arranged rotary plate or sliding table. The at least one first mold half is preferably fastened to this rotary plate or sliding table. The rotary plate and/or sliding table is further mounted correspondingly movable, that the first mold half can be moved between the stations, in particular between the first injection-molding station and the stamping station and/or the at least one printing station.

The injection-molding device here preferably has not only one first mold half, but two or more first mold halves, which are arranged on a common mold carrier. It is hereby possible to considerably increase the effectiveness of the production methods, as well as the efficiency of the individual stations. If for example two first mold halves are arranged on a common mold carrier, then while the stamping is being carried out in the stamping station a new base body can already be injection-molded in parallel in the first injection-molding station, and a doubling of the efficiency can correspondingly be achieved hereby.

Preferably, at least n first mold halves are here arranged on the common mold carrier of an injection-molding device with a quantity of n stations. If the injection-molding device thus has, for example, a first injection-molding station, a stamping station, a second injection-molding station and a demolding station, at least four mold halves are provided on the common mold carrier. The four processing steps which are carried out by these four stations can thus be carried out in each case in parallel, whereby the efficiency is correspondingly improved.

The injection-molding device preferably further has an adjusting device for moving the first mold half or in particular mold halves arranged on a common mold carrier between the stations of the injection-molding device. This adjusting device can here be provided by a corresponding servo drive and/or a hydraulic drive and/or a pneumatic drive. This adjusting device is preferably actuated by a process-control device, which moves the one or more first mold halves cyclically in a predefined sequence between the two or more stations of the injection-molding device and supplies them to the respective stations for the processing.

BRIEF DESCRIPTION OF THE DRAWINGS

In the following the invention is explained with reference to several embodiment examples utilizing the attached drawings by way of example.

FIG. 2a, FIG. 2b and FIG 2c show schematic representations to illustrate further method steps of a method for producing a component.

FIG. 5 shows a schematic representation of an injection-molding device for producing a component.

DETAILED DESCRIPTION

Figure 1A:
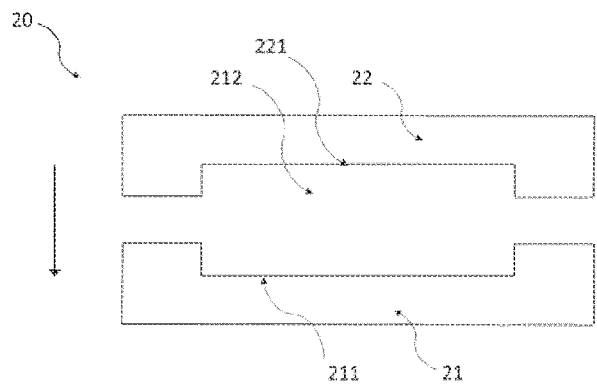
FIG. 1a-FIG. 1f illustrate, with reference to several schematic representations, the performance of a method for producing a component.

With reference to FIGS. 1a to 1f, a method for producing a component is described in the following:

FIG. 1a shows a first mold half 21 and a second mold half 22 of an injection mold 20.

The first mold half 21 has a first mold cavity 201 and the second mold half 22 has a second mold cavity 221, which together form an injection-molding cavity 212 when the injection mold 20 is closed. The injection mold 20 is part of an injection-molding device 40, which further preferably has still further components, not shown here, in particular a closing device for opening and closing the injection mold 20, and an injection unit for introducing a plastic material into the first injection-molding cavity 212.

In the step illustrated in FIG. 1a, the injection mold 20 is closed and thus the first injection-molding cavity 211 defined by the two mold halves 21, 22 is formed.

Here, it is further also possible for a film element to be introduced into the injection-molding cavity 212 before the injection mold 20 is closed.

This film element, called second film element in the following, is preferably
- either a laminating film preferably formed over part of the surface, for example as a "label",
- or a so-called "insert" as a premolded partial element provided in particular with decorative and/or functional elements or an insert part in particular as a functional reinforcing or stiffening element made of metal and/or plastic and/or fiber composite and/or plastic with fiber components,
- or a transfer film which, as explained at the beginning, is introduced into the lower mold half 21 over the whole surface.

For this, it can further be provided that the lower, second mold half 22 has corresponding openings in its mold cavity for guiding these one or more second film elements during the injection-molding process, and corresponding retaining devices are provided on the injection mold in order to fix the one or more second film elements during the subsequent injection-molding step.

The one or more second film elements here are preferably placed in the first mold half such that a first surface of the one or more second film elements is in direct contact with the surface of the first mold cavity 211. It is hereby brought about that the one or more second film elements form the lower surface or a part of the lower surface of the component and develop their functional and/or decorative action there.

However, it is also possible for the one or more second film elements to be positioned spaced apart from the first mold half 21 in the first injection-molding cavity 212 by corresponding retaining means, with the result that they are then extrusion-coated with the plastic material.

Figure 1B:
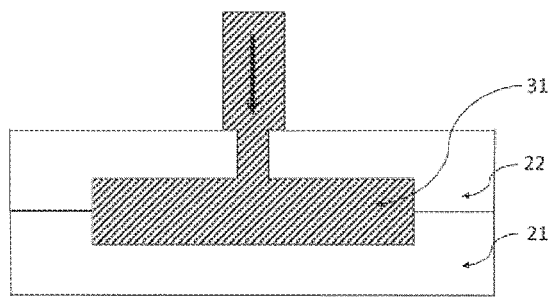

In a next step, as illustrated in FIG. 1b, a first plastic material 31 is then introduced into the first injection-molding cavity 212 and a base body 11 is hereby injection molded.

A thermoplastic, preferably consisting of ABS, ASA, ABS-PC, PC, PC-PPT, ASA-PC, is preferably used here as first plastic material 31. This plastic is then injected into the first injection-molding cavity 212 in the liquid state.

Figure 1C:
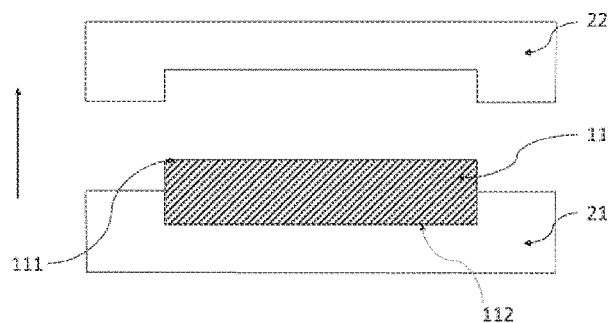

Then, as shown in FIG. 1c, the injection mold 20 is opened.

For this, the second mold half 22 is preferably moved upwards translationally, and thus the upper surface of the base body 1 defined in terms of its surface shape by the second mold cavity 221 is exposed. Here, the period of time between the permeation of the first plastic material 31 according to FIG. 1b and the opening of the injection mold 20 according to FIG. 1c is chosen such that the first plastic material 31 has transitioned from the liquid state into a solid state by cooling and/or crosslinking. At this time, however, the first plastic material is preferably not yet completely cooled and/or crosslinked, as also stated in even more detail in the following.

As shown in FIG. 1c, when the injection mold 20 is opened the base body 11 remains following the contours in the first mold cavity 211 of the first mold half 21. Thus, only a first partial area 111 of the surface of the base body 11 is exposed. A second partial area 112 of the surface of the base body 11, however, still remains in the first mold half. Thus a complete removal of the base body 11 from the mold still does not take place at this time.

Figure 1D:
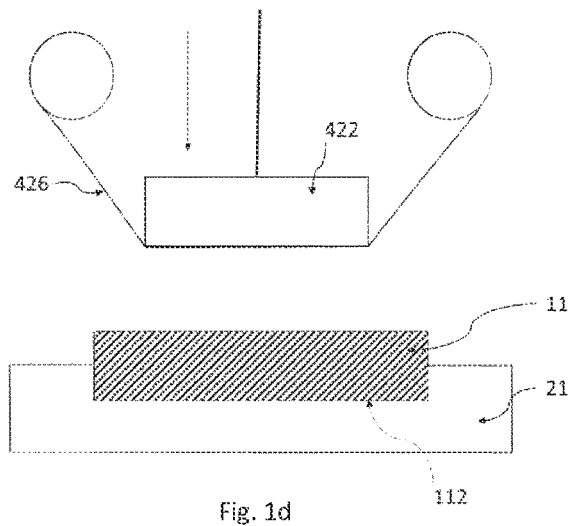
Figure 1E:
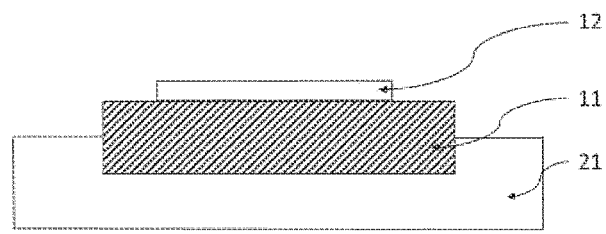

Then, as indicated in FIG. 1d and FIG. 1e, one or more first film elements 12 are stamped onto at least one partial area of the exposed first partial area 111 of the surface of the base body 11.

During this stamping the base body 11 remains following the contours in the first mold cavity 211 of the first mold half 21. The first mold half 21 thus acts as stamping receiver for the stamping of the one or more first film elements 12.

The stamping of the one or more first film elements 12 is preferably carried out by means of one or more stamping tools 422, which apply a film 426, or one or more sections of the film 426, as first film elements 12 to the exposed surface or a partial area of the exposed surface of the base body 11.

As indicated in FIG. 1d, during the stamping the film 426 arranged between a stamping tool 422 and the exposed surfaces of the base body 11 is pressed against at least one partial area of the exposed surface of the base body 11 over the whole surface or in areas. The stamping pressure is built up between the stamping tool 422 and the first mold half 21 as stamping receiver. As already stated above, because of the contour-following formation of the first mold cavity 211 relative to the base body 11, an exactly fitting stamping receiver is provided here for the base body 11, with the result that a constant stamping pressure can be maintained over the entire exposed surfaces of the base body 11, and thus the necessary tolerances can also be adhered to exactly.

The stamping of the one or more film elements 11 here is preferably effected by means of roll-on stamping, partial roll-on stamping or vertical stamping. Correspondingly, the stamping tool 422 is formed as a stamping roller or stamping die.

Instead of one stamping tool, different stamping tools or different stamping methods can also be used, which stamp one or more of the first film elements 12 onto the exposed surface of the base body 11 in parallel or successively. Here, in each case, similar or different films 426 can moreover also be used.

Preferably, transfer films, in particular hot-stamping films or cold-stamping films, and laminating films are used as film 426.

Transfer films here preferably have a carrier ply, and a transfer ply detachable therefrom. The carrier ply preferably consists of a plastic film, in particular of a PET film with a layer thickness of between 10 μm and 250 μm. This is preferably followed by a detachment layer, which preferably consists of a wax and/or of polymers. The purpose of the detachment layer is to make it possible to detach the transfer ply under the conditions of the stamping method. The detachment layer can also be dispensed with here if the material layers of the carrier ply and of the transfer ply adjoining each other are formulated corresponding to each other.

The transfer ply, as already stated above, in each case preferably has one or more decorative layers and/or one or more functional layers. In this respect, reference is made to the above statements. Optionally, depending on the stamping method used, the transfer film can have an adhesive layer or not. Thus, the transfer film, when it is designed as a hot-stamping film, preferably has an adhesive layer on its underside which consists of a thermally activatable and/or thermally crosslinkable adhesive, in the simplest case a heat seal adhesive. In its design as a laminating film, the film 426 has a carrier ply, in particular a plastic film with a layer thickness of between 15 μm and 125 μm, which remains in the applied first film elements 12. Ideally, the film has another one or more decorative layers and/or functional layers and optionally an adhesive layer, corresponding to the design of the transfer ply of a transfer film. In this respect, reference is made to the above statements regarding this.

Moreover, it is advantageous if the transfer ply of the transfer film has another one or more protective layers on its side facing the carrier ply. Correspondingly, it is further also advantageous if the film 426, in its design as a laminating film, has one or more protective layers on its side facing away from the exposed surface of the base body 11.

These protective layers here preferably have one or more layers which are curable, in particular post-curable, by means of crosslinking. For this, after the stamping of the one or more first film elements has been carried out, a corresponding post-curing, for example by irradiation by means of UV light, is preferably brought about in a subsequent step. A post-curing can here further also be effected by thermal post-curing. Through the use of such protective layers, the protection of the first film elements 12, and of the base body 11, from environmental influences is also considerably improved.

If the film 426 is formed as a hot-stamping film, then during the stamping a section of the transfer ply of the hot-stamping film defined by the shape of the stamping tool 422 is pressed against a section of the exposed surface of the base body 11. The stamping tool 422 is preferably heated here, with the result that in the section defined by the shape of the stamping tool an adhesive layer of the transfer ply or an adhesive layer provided between the base body 11 and the transfer ply is activated by the elevated pressure/temperature there, and thus the transfer ply of the hot-stamping film is adhesively bonded to the surface of the base body 11 in the area of this section. It is also possible here to dispense with a heating of the stamping tool 422 if the stamping according to FIG. 1d is effected correspondingly close in time after the injection molding according to FIG. 1b and thus the base body 11 still has a correspondingly high surface temperature.

Optionally, it can also be provided to preheat the hot-stamping film using a heating device before it is applied.

The chronological sequence of the injection molding according to FIG. 1b and of the steps according to FIG. 1d and FIG. 1e is thus preferably controlled such that the base body 11 is only partially cooled during the stamping of the one or more film elements 12, in particular still has an average surface temperature in the first partial area 111 of the surface of between 20° C. and 120° C., in particular between 40° C. and 100° C., preferably between 50° C. and 80° C.

After activation of the adhesive layer, the hot-stamping film is peeled off again, and in the process the carrier ply and the areas of the transfer ply in which the adhesive layer has not been activated are peeled off again. The areas of the transfer ply of the hot-stamping film thus remain as first film elements 12 on the base body 11, in which the adhesive layer has been activated by the stamping tool 422.

Following this, another post-curing of the adhesive layer and/or further layers of the transfer ply can preferably be carried out.

When a cold-stamping film is used as film 426, an adhesive layer is applied to the transfer ply of the cold-stamping film and/or to the exposed surfaces of the base body 11 in a first area, but not in a second area. The adhesive layer is preferably printed by means of a digital printing method, in particular an inkjet printhead. By means of the stamping tool 422, the cold-stamping film is then guided towards the surface of the base body 11, the adhesive layer is activated and the cold-stamping film is peeled off again. A section of the transfer ply defined by the shape of the first area is hereby applied as first film element 12 to the exposed surface of the base body 11. The activation of the adhesive layer is preferably effected here with irradiation with high-energy electromagnetic radiation, for example by means of UV radiation by means of UV LEDs. The advantage of this method is that the stamping tool 422 need not be manufactured individually, rather the transfer film only needs to be pressed on correspondingly in a predetermined partial area of the surface of the base body.

Further, it is also possible for the transfer ply of the transfer film to be structured by means of openings which correspond to the outlines of the section to be transferred and thus to the outlines of the one or more first film elements 12.

Further, it is also possible for the transfer ply already to be formed in the form of premolded film elements which are laminated correspondingly onto the predetermined areas of the exposed surface of the base body 11 during the stamping. Moreover, it is also possible for the film already to be supplied to the stamping tool 422 in the form of the one or more first film elements 12 to be formed and then applied by it to the predetermined areas of the exposed surfaces of the base body 11, without the need for still further measures here.

As already stated above, the stamping of the one or more film elements here can also be carried out multiple times in succession using different films 426, with the result that the one or more first film elements 12 are provided not overlapping or partially overlapping or completely overlapping each other. For the corresponding register-accurate stamping of the film elements 12, it is advantageous here to detect corresponding register marks and/or optical features on the film 426 or the one or more first film elements 12, in order to achieve a corresponding register-accurate application of the one or more first film elements relative to each other.

If, as already stated above, another one or more second film elements are optionally inserted into the first injection-molding cavity 212 here when the injection molding is carried out, then it is advantageous to stamp the one or more first film elements further also register-accurate relative to these one or more second film elements. For this, one or more register marks or optical features of the one or more second film elements can additionally be detected. Further, it is particularly advantageous here that the positioning of the one or more second film elements is definitively influenced by the first mold half 21 and the first mold half 21 represents the stamping receiver for the stamping process, i.e. the one or more second film elements are arranged correspondingly register-accurate relative to the stamping receiver.

Figure 1F:
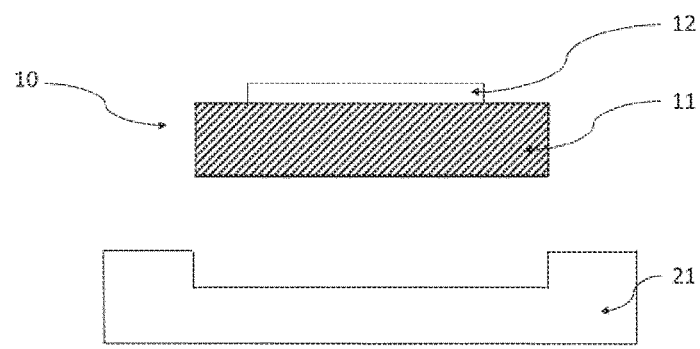

In a next step, as represented in FIG. 1f, the component 10, which comprises the base body 11 and the one or more first film elements 12, is then removed from the first mold half 21.

Further, it is possible for still further steps to be carried out in addition to the steps explained above during the method. It is particularly advantageous here that the following still further steps are carried out for this:

Thus, after the one or more first film elements 12 have been stamped and before the demolding according to FIG. 1f, the step in which a cover layer 13 made of a second plastic material 32 is applied can be performed another one or more times.

To carry out this step, the procedure here is preferably as illustrated in FIG. 2a to FIG. 2c:

In this step the base body 11 thus remains following the contours in the first mold cavity 211 of the first mold half 21. Further, a second injection-molding cavity 213 is formed by means of one or more third mold halves 23. For this, as illustrated in FIG. 2a, for example an injection mold, formed of the first mold half 21 and the third mold halves 23, is closed, namely such that the third mold half 23 seals the one or more first film elements 12 and/or the first mold half 21 against the base body 11.

As illustrated in FIG. 2b, the second injection-molding material 32 is then introduced into the second injection-molding cavity 213.

The second plastic material 32 preferably consists of a thermoplastic material, of a plastic material that can be cured by crosslinking, in particular a two-component material, a thermally curable and/or radiation-curable material and/or a mixture of such plastic materials.

The second plastic material here particularly preferably consists of a plastic material that cures by crosslinking, in particular of polyurethane or polyurea. A particularly weather-proof "protective layer" can hereby be provided for the one or more first film elements 12.

Further, it is advantageous if the one or more first film elements 12 also have a corresponding adhesion-promoting layer matched to the second plastic material 32 on their upper side pointing towards the cover layer 13 and/or if the second plastic material 32 is also post-cured in a subsequent curing step, in order to achieve a layer composite that adheres particularly well, and a particularly weather-proof upper side of the component 10.

When removed from the mold, the base body 11, as illustrated in FIG. 2c, thus further also has the cover layer 13 in addition to the base body 11 and the one or more film elements 12.

Figure 3:
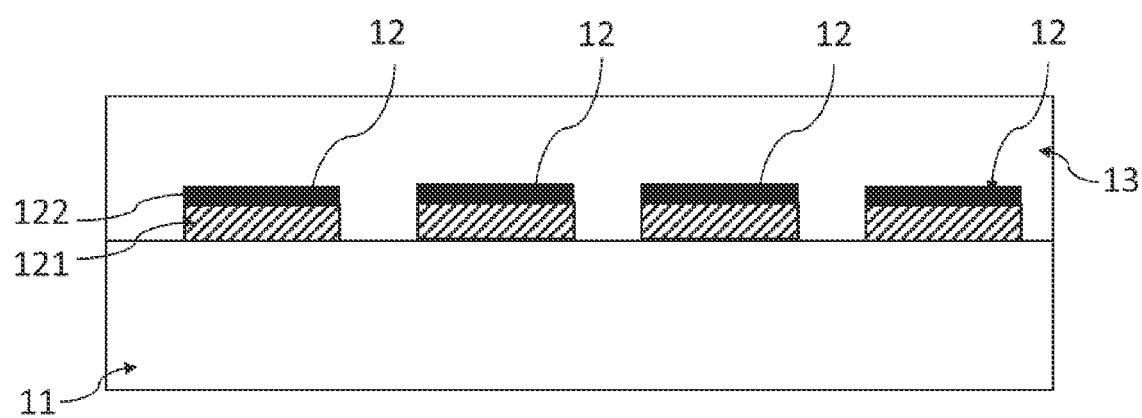
FIG. 3 shows a sectional representation of a component.

An example of the layer structure of the component 10 produced hereby is illustrated in FIG. 3:

The one or more first film elements 12 are applied to the base body 11. These are followed by the cover layer 13. The first film elements 12 here have one or more decorative layers and/or functional layers 121, and an adhesion-promoting layer 122, which makes a particularly good adhesion between the cover layer 13 and the individual first film elements 12 possible.

As already stated above, the application of the cover layer 13 can also be repeated multiple times, and can also be effected one or more times between the stamping of one or more first film elements 12.

It is advantageous if the cover layer 13 covers the one or more first film elements 12 over the whole surface and/or the one or more first film elements 12 are encased between the base body 11 and the cover layer 13 or one of the cover layers 13.

Depending on the use, however, it can further be advantageous that the cover layer 13 overlap the one or more film elements 12 and/or the first partial area 111 of the surface of the base body 11 only over part of the surface and thus for example provide still further decorative and/or functional elements.

Further advantageous additional steps in carrying out the method are:

Pretreating an exposed partial area of the surface of the base body 11 and/or the one or more first film elements 12, in particular using one or more processing methods selected from: treatment with gas, flame treatment, plasma treatment, fluorination, treatment, cleaning, surface activation, coating. Such a pretreatment is preferably carried out between the method steps explained in FIG. 1c and FIG. 1d, in order to correspondingly pretreat the exposed surface of the base body 11 or the partial area of the surface of the base body 11 to which the one or more first film elements 12 are applied, in order to achieve a particularly good adhesiveness between the base body 11 and the one or more first film elements 12. Further, additional decorative functions can also be achieved by such a pretreatment. Further, in the case in which the stamping is carried out multiple times in succession, such a pretreatment can be carried out between the individual stamping steps or can be carried out before the step illustrated in FIG. 2a is carried out, in order to improve the adhesion between the second plastic material 32 and the base body 11 and/or the one or more first film elements.

Printing on the one or more first film elements 12 and/or the exposed first partial area of the surface of the base body 11 in at least one further partial area, wherein the base body 11 remains following the contours in the first mold cavity 211 of the first mold half 21 and in particular the first mold half 21 acts as printing holder for the printing on the one or more film elements 12 and/or the exposed first partial area of the surface of the base body 11 in the at least one further partial area. Such a printing is advantageously carried out after the method step shown in FIG. 1c, preferably after the method step shown in FIG. 1e. It is possible here for the printing to be effected with a printing material, such as for example a colored ink, such that the printing material is arranged on the free surface of the one or more film elements 12 and/or next to the one or more film elements 12, in particular directly on the base body. Expediently, the printing, as explained above, in the at least one further partial area represents a decoration or design element, preferably a colored decoration or design element, and is further preferably produced for example by means of inkjet printing.

Optically checking a partial area of the surface of the base body 11 and/or the one or more first film elements 12 and/or the component 10. This optical check is preferably carried out by means of optical sensors, for example a camera. As a result, for one thing, a quality assurance can be carried out, for example by means of a use of image-recognition algorithms, and, for another, a readjustment of process parameters can also be controlled. Such an optical check is preferably carried out between the steps illustrated in FIG. 1c and FIG. 1d, FIG. 1e and FIG. 1f or FIG. 1e and FIG. 2a.

Cleaning, in particular, the exposed surface of the base body 1, the one or more first film elements 12 and/or the cover layer 13. Such a cleaning can be realized in particular by means of brushes, compressed air and/or suction. It is particularly advantageous here that the base body 11 is still held in the first mold half 21 at this time and thus is fixed correspondingly well, in order even to absorb greater mechanical forces which are introduced by the cleaning method.

Figure 4A:
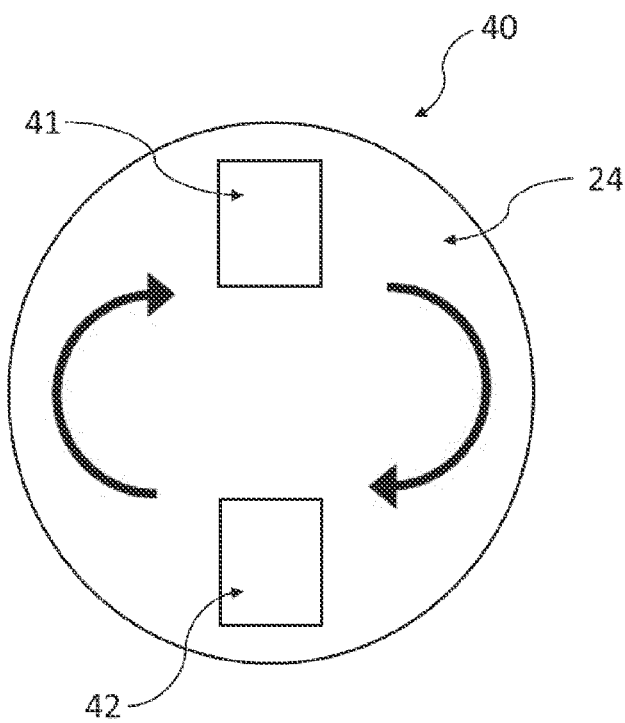
FIG. 4a, FIG. 4b illustrate in each case a schematic representation of an injection-molding device for producing a component.
Figure 4B:
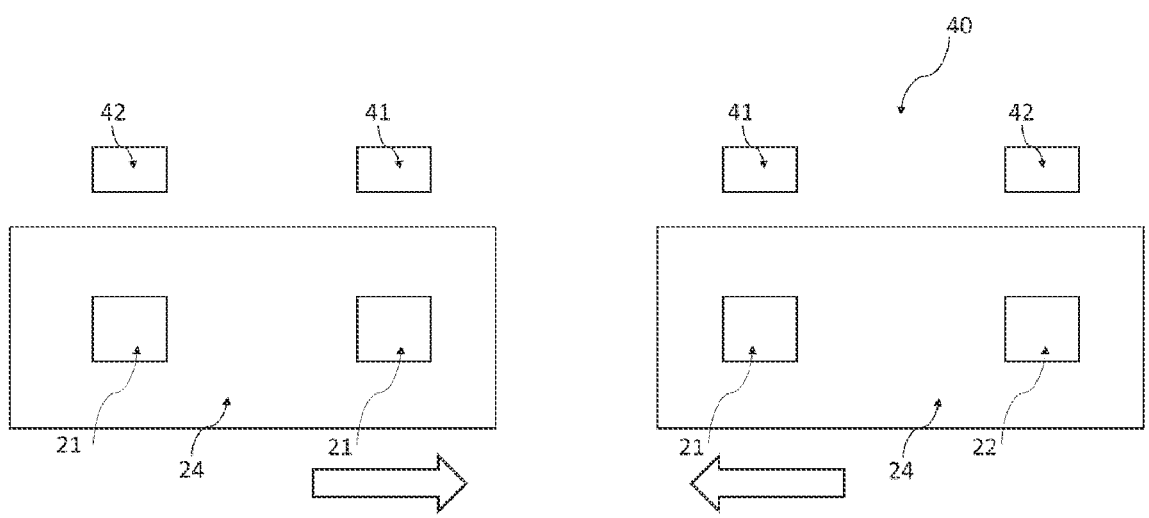

The structure of an injection-molding device 40 for carrying out the method described above with reference to FIG. 1a to FIG. 1f is outlined schematically in FIG. 4a and FIG. 4b:

The injection-molding device 40 according to FIG. 4a has at least one first injection-molding station 41 and at least one stamping station 42. Further, the injection-molding device 40 has a movably mounted mold carrier 24, which in the embodiment example according to FIG. 4a is formed by a horizontally arranged rotary plate which, as indicated in FIG. 4a, is mounted rotatable about the central axis.

One or more first mold halves 21 are arranged on the mold carrier 24, in particular are securely connected thereto, with the result that the one or more first mold halves 21 can be supplied cyclically to the injection-molding station 41 and the stamping station 42 by rotation of the mold carrier 24.

FIG. 5 illustrates an embodiment of the injection-molding device 40 according to FIG. 4a in which two first mold halves 21 are installed on the mold carrier 24. Such an arrangement is advantageous compared with the arrangement of only one mold half 21 on the mold carrier 24, as the production speed can be doubled hereby. This is because, in parallel with the stamping of the one or more first film elements 12 onto the base body 11, a further base body can already be cast again by the injection-molding station 41.

In addition to the mold carrier 24, the two first mold halves 21, the injection-molding station 41 and the stamping station 42, the injection-molding device 40 according to FIG. 5 also has an adjusting device 25 for moving the first mold halves 21 arranged on the common mold carrier 24, and a process-control device 50.

The injection-molding station 41 has at least one second mold half 22, a closing device 411, and an injection unit 412. The closing device 411 performs the closing of the injection mold 20 formed by the first mold half 21 and the second mold half 22 in the injection-molding station 41, whereby the first injection-molding cavity 212, as also explained with reference to FIG. 1a, is formed. Further, the closing device 411 also performs the opening of the injection mold 20, as also explained above with reference to FIG. 1c. The closing device 411 here preferably consists of a corresponding guiding device as well as hydraulic and/or pneumatic elements, which make a corresponding translational movement of the second mold half 22 relative to the first mold half 21 in the injection-molding station 41 possible.

The injection unit 412, as already explained above with reference to FIG. 1b, introduces the first plastic material 31 into the first injection-molding cavity 212. For this, the injection unit 412 has corresponding elements in order to melt the first plastic material 31 correspondingly and to inject it into the injection mold 20 with correspondingly high pressure.

The stamping station 42 has a stamping unit 421 for stamping the one or more film elements 12 onto at least one partial area of the surface of the base body 11. The stamping unit 421 thus performs the steps already explained above with reference to FIG. 1d and FIG. 1e.

The stamping unit 421 here preferably has a stamping tool 422, as well as a film-supplying device 424 and a film-discharging device 425, which move the films 426 over the stamping tool 422. The stamping unit 421 carries out the steps already explained above with reference to FIG. 1d and FIG. 1e and is formed as already described above regarding this. In the embodiment example according to FIG. 5, the stamping tool 422 here is moved in the manner of a lifting press translationally towards the stamping receiver, which is formed by the first mold half 21. However, as already described above, it is also possible for the stamping tool 422 to be for example a stamping roller or a movably mounted stamping head, which applies the one or more first film elements 12 to the first surface by rolling on or a rolling-on movement.

The adjusting device 25 is preferably formed as a servo motor, which brings about a rotatory movement of the rotary plate in the case of the formation of the mold carrier 24 as a horizontal or vertical rotary plate.

The process-control device 50 consists of one or more microprocessors, peripheral components for controlling the injection-molding station 41, the stamping station 42 and the adjusting device 25, and over corresponding software components.

These software components are here designed such that they bring about an actuation of the injection-molding station 41, the stamping station 42 and the adjusting device 25 such that the method explained with reference to FIG. 1*a* to FIG. 1*c* is carried out. Thus, first, the injection-molding station 41, and in particular the closing device 411 and the injecting device 41, is correspondingly actuated, in order to carry out the steps explained in FIG. 1*a* to FIG. 1*c*. Then, the adjusting device 25 is actuated to rotate the mold carrier 24 by 180° and thus to supply the first mold half 21 with the injection-molded base body 11 to the stamping station 42. After that, the stamping unit 421 is actuated such that it carries out the method steps explained in FIG. 1*d* and FIG. 1*e* and stamps the one or more first film elements 12 onto the base body 11.

As already explained above, diverse variations and extensions of this basic concept are possible.

Thus, for example, FIG. 4*b* shows an embodiment of the injection-molding device 40 in which, instead of a mold carrier 24 in the form of a rotary plate, a mold carrier 24 in the form of a sliding table is used. Thus, the injection-molding device 40 according to FIG. 4*b* has two mold carriers 24 in the form of a sliding table in each case, as well as in each case two first mold halves 21 installed thereon. Further, two injection-molding stations 41 and two stamping stations 42 are provided, which are positioned as illustrated in FIG. 4*b* with respect to the respective mold carrier 24. The injection-molding device 40 is otherwise constructed as described above with reference to FIG. 5, except that the adjusting device 25 moves the mold carrier 24 translationally alternately to the left and to the right.

The arrangement according to FIG. 4*b* with the two injection-molding stations 41 arranged adjacent is particularly advantageous here, as components can be utilized together by the two injection-molding stations 41 because of their closeness in space.

Figure 6:
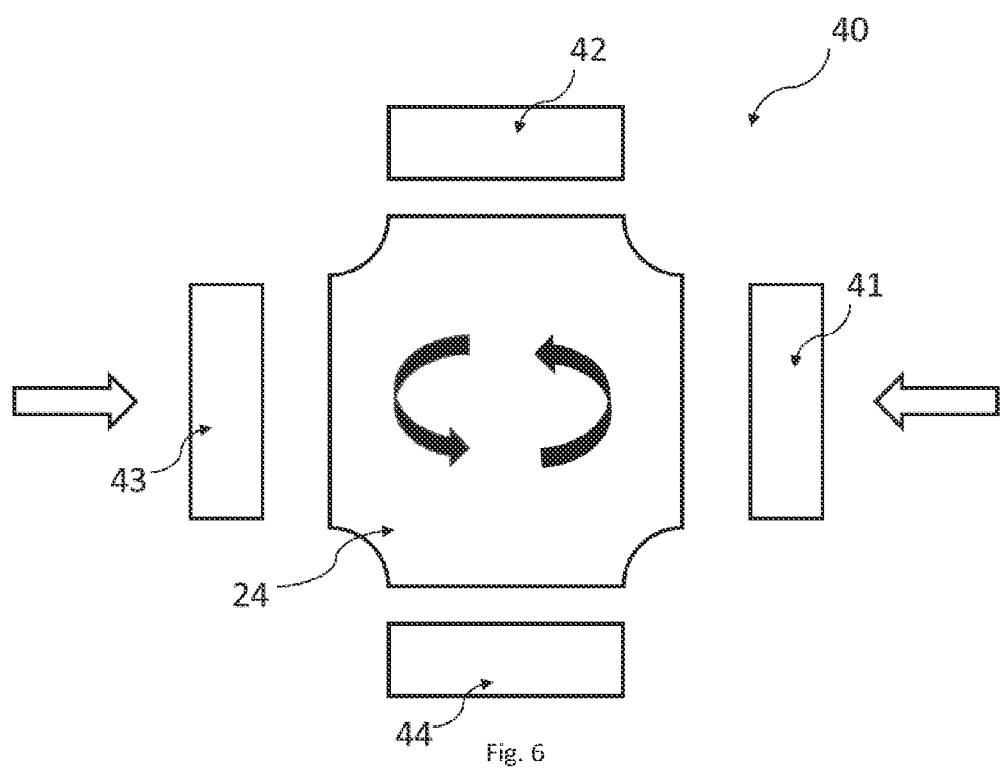
FIG. 6 shows a schematic representation of an injection-molding device for producing a component.

A further modification is shown in FIG. 6:

The injection-molding device 40 here has four stations, namely the injection-molding station 41, the stamping station 42 and further another second injection-molding station 43 and a demolding station 44.

The mold carrier 24 here is formed as a vertical and/or horizontal rotary plate. Four first mold halves 21 are arranged on the mold carrier 24 offset in each case by 90° relative to each other. Through rotation of the mold carrier 24 these four first mold halves 21 can thus be moved cyclically between the stations 41, 42, 43 and 44 of the injection-molding device 40.

With respect to the additional components, the following results here:

The second injection-molding station 43 is constructed like the injection-molding station 41 according to FIG. 3, except that the second injection-molding station 43 applies the second plastic material 32 as a cover layer 13 and carries out the steps illustrated above with reference to FIG. 2*a* to FIG. 2*b*.

The demolding station 44 carries out the step already explained above with reference to FIG. 2*c*. The demolding station 44 here has, for example, a robot arm which takes the component 10 out of the first mold half 21, as illustrated for example with reference to FIG. 2*c*.

For the rest, the injection-molding device 40 is constructed as already explained above with reference to FIG. 5, with the result that reference is made to the above statements regarding FIG. 5, FIG. 1*a* to FIG. 1*e*, and FIG. 2*a* to FIG. 2*c* in this respect.

LIST OF REFERENCE NUMBERS

10 component
11 base body
111 first partial area
112 second partial area
12 first film element
121 functional layer
122 adhesion-promoting layer
13 cover layer
20 injection mold
21 first mold half
211 first mold cavity
212 first injection-molding cavity
213 second injection-molding cavity
22 second mold half
221 second mold cavity
23 third mold half
24 mold carrier
25 adjusting device
31 first plastic material
32 second plastic material
40 injection-molding device
41 first injection-molding station
411 closing device
412 injection unit
42 stamping station
421 stamping unit
422 stamping tool
424 film-supplying device
425 film-discharging device
426 film
43 second injection-molding station
44 demolding station
50 process-control device

The invention claimed is:

1. A method for producing a component, the method comprising:
   a) closing an injection mold comprising a first mold half with a first mold cavity and at least one second mold half, wherein a first injection-molding cavity defined by the first mold half and the at least one second mold half is formed;
   b) injection molding a base body by introducing a first plastic material into the first injection-molding cavity;
   c) opening the injection mold, wherein the base body remains following the contours in the first mold cavity of the first mold half and only a first partial area of the surface of the base body is exposed, but a second partial area of the surface of the base body still remains in the first mold half;

d) stamping one or more first film elements onto at least one partial area of the exposed first partial area of the surface of the base body, wherein the base body remains following the contours in the first mold cavity of the first mold half and the first mold half acts as stamping receiver for the stamping of the one or more first film elements;

e) removing the component, comprising the base body and the one or more first film elements, from the first mold half, wherein the chronological sequence of steps b) and d) is controlled such that the base body is only partially cooled when step d) is carried out and still has an average surface temperature in the first partial area of the surface of between 20° C. and 120° C., and wherein a hot-stamping film comprising a carrier ply and a transfer ply detachable therefrom is used as the film in step d), and during the stamping, at least one section of the transfer ply defined by the shape of the stamping tool is applied as the first film element by activating an adhesive layer of the transfer ply or an adhesive layer provided between the base body and the transfer ply, and wherein, during the stamping, a section of the transfer ply of the hot-stamping film defined by the shape of the stamping tool is pressed against a section of the exposed surface of the base body whereby the average surface temperature in the first partial area of the exposed surface of the base body contributes to the activation of the adhesive layer of the transfer ply or the adhesive layer provided between the base body and the transfer ply, and wherein, after activation of the adhesive layer, the hot-stamping film is peeled off again, and, in the process, the carrier ply and the areas of the transfer ply in which the adhesive layer has not been activated are peeled off again, wherein the areas of the transfer ply of the hot-stamping film thus remain as the first film element on the base body, in which the adhesive layer has been activated by the stamping tool.

2. The method according to claim 1, wherein the following further step is carried out one or more times after step d):

f) applying a cover layer made of a second plastic material.

3. The method according to claim 2, wherein, when step f) is carried out, the base body remains following the contours in the first mold cavity of the first mold half.

4. The method according to claim 2, wherein, when step f) is carried out, a second injection-molding cavity is formed by means of one or more third mold halves and the second plastic material is introduced into the second injection-molding cavity.

5. The method according to claim 2, wherein, in step f), the cover layer is applied such that the one or more film elements are encased between the base body and the cover layer.

6. The method according to claim 2, wherein, in step f), the cover layer is applied such that the cover layer completely overlaps the one or more film elements and/or the first partial area of the surface of the base body.

7. The method according to claim 2, wherein, in step f), the cover layer is applied such that the cover layer overlaps the one or more film elements and/or the first partial area of the surface of the base body only over part of the surface.

8. The method according to claim 2, wherein the second plastic material consists of a thermoplastic material, of a plastic material that cures by crosslinking, and/or of a thermally curable and/or radiation-curable material, and/or of a mixture of such plastic materials.

9. The method according to claim 2, wherein the second plastic material is fully or partially cured.

10. The method according to claim 2, wherein the second plastic material consists of polyurethane or polyurea and the first plastic material consists of a thermoplastic.

11. The method according to claim 2, wherein step f) is carried out multiple times with different second plastic materials and/or different third mold halves.

12. The method according to claim 1, further comprising printing on the one or more first film elements and/or the exposed first partial area of the surface of the base body in at least one further partial area, wherein the base body remains following the contours in the first mold cavity of the first mold half.

13. The method according to claim 1, wherein an optical check of a partial area of the surface of the base body, the one or more first film elements, the printing and/or the component by means of an optical sensor, is effected between steps d) and e) and/or between steps c) and e) and/or before step d).

14. The method according to claim 1, wherein, in step d), the stamping of the one or more first film elements is carried out by means of roll-on stamping, partial roll-on stamping or vertical stamping.

15. The method according to claim 1, wherein, in step d), the stamping of the one or more first film elements is carried out by means of one or more stamping tools, which apply a film or one or more sections of a film as first film elements to the exposed first partial area or a partial area of the exposed first partial area of the surface of the base body.

16. The method according to claim 1, wherein, before step a), one or more second film elements are introduced into the first injection-molding cavity, and in step (b) are back-injection molded and/or extrusion coated with the first plastic material.

17. The method according to claim 16, wherein, while step d) is being carried out, one or more of the one or more first film elements are stamped register-accurate relative to one or more of the second film elements.

* * * * *